(12) United States Patent
Odom

(10) Patent No.: US 6,941,390 B2
(45) Date of Patent: Sep. 6, 2005

(54) DMA DEVICE CONFIGURED TO CONFIGURE DMA RESOURCES AS MULTIPLE VIRTUAL DMA CHANNELS FOR USE BY I/O RESOURCES

(75) Inventor: Brian Keith Odom, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 258 days.

(21) Appl. No.: 10/289,797

(22) Filed: Nov. 7, 2002

(65) Prior Publication Data

US 2004/0093438 A1 May 13, 2004

(51) Int. Cl.⁷ .............................................. G06F 13/28
(52) U.S. Cl. ................... 710/22; 710/1; 710/4; 710/20; 710/23; 710/26; 710/27; 710/28; 710/31; 710/36; 710/72; 710/107; 711/6; 711/111; 711/112; 711/203; 712/225
(58) Field of Search .................. 710/1, 4, 20–28, 710/31, 36, 72, 107; 711/6, 111, 112, 203; 712/225; 709/104, 1

(56) References Cited

U.S. PATENT DOCUMENTS

| | | | |
|---|---|---|---|
| 5,603,033 A | * | 2/1997 | Joannin ....................... 717/124 |
| 5,619,727 A | * | 4/1997 | Chen et al. .................... 710/22 |
| 5,659,749 A | | 8/1997 | Mitchell et al. |
| 5,678,063 A | | 10/1997 | Odom et al. |
| 5,686,917 A | | 11/1997 | Odom et al. |
| 5,694,333 A | | 12/1997 | Andrade et al. |
| 6,026,443 A | * | 2/2000 | Oskouy et al. ............. 709/230 |
| 6,260,081 B1 | * | 7/2001 | Magro et al. ................. 710/22 |
| 6,370,270 B1 | | 4/2002 | Nair et al. |
| 6,622,181 B1 | * | 9/2003 | Comisky et al. .............. 710/22 |

* cited by examiner

*Primary Examiner*—Jeffrey Gaffin
*Assistant Examiner*—Niketa Patel
(74) *Attorney, Agent, or Firm*—Meyertons Hood Kivlin Kowert & Goetzel, P.C.; Jeffery C. Hood

(57) ABSTRACT

Various embodiments of a system and method for configuring a set of DMA resources as multiple virtual DMA channels are disclosed. In one embodiment, a system may include a context memory configured to store context parameters for each of the virtual DMA channels, a set of DMA resources, a DMA controller coupled to the context memory, and several I/O resources. The DMA controller is configured to configure the set of DMA resources as different virtual DMA channels using context parameters associated with different respective ones of the virtual DMA channels. Each virtual DMA channel corresponds to one of the I/O resources.

35 Claims, 8 Drawing Sheets

DMA DEVICE CONFIGURED TO CONFIGURE DMA RESOURCES AS MULTIPLE VIRTUAL DMA CHANNELS FOR USE BY I/O RESOURCES

FIELD OF THE INVENTION

The present invention relates to a DMA device that reconfigures a set of DMA resources as multiple virtual DMA channels for use by various I/O resources.

DESCRIPTION OF THE RELATED ART

Modem instrumentation systems typically include a computer system that controls one or more instruments to perform a desired test and measurement application. Accordingly, the computer system is required to control the operation of a number of different instruments. In computer systems that include modern multi-threaded, multitasking operating systems, a number of different processes or threads may be executing on the computer system CPU (Central Processing Unit) to control the operation of multiple instruments. In order to decrease the workload of the CPU, modern instrumentation systems typically include a direct memory access (DMA) device that performs various data transfers between the instruments and the computer system.

A data acquisition system may have a large number of data streams to be moved between one or more instruments and system memory. Generally, DMA is the most efficient method of moving the data between an instrument and system memory since it requires reduced intervention from the host CPU. However, DMA channels are an expensive resource, and consequentially, they tend to be available in limited numbers in current systems. As a result, resources tend to either not use DMA or to have data from multiple channels aggregated into a single data stream. Aggregating multiple channels into a single data stream is undesirable because it requires all of the channels to have related sample rates and the host software to de-interleave transferred data before delivering it to the various channels' buffers.

SUMMARY OF THE INVENTION

Various embodiments of a system and method for configuring a set of DMA resources as multiple virtual DMA channels are disclosed. In one embodiment, a system may include a context memory configured to store context parameters for each of the virtual DMA channels, a set of DMA resources, a DMA controller coupled to the context memory, and several I/O resources. The DMA controller is configured to configure the set of DMA resources as different virtual DMA channels using context parameters associated with different respective ones of the virtual DMA channels. Each virtual DMA channel may correspond to one of the I/O resources.

The set of DMA resources may include a buffer, a data conversion unit, a bus, and address and data counters. The context parameters associated with a first one of the virtual DMA channels may specify settings and/or values for various ones of the DMA resources.

One embodiment of a method of performing DMA transfers may involve reading first context parameters for a first virtual channel from a context memory that stores context parameters for several virtual channels, configuring a set of DMA resources as the first virtual channel according to the first context parameters, and initiating a first DMA transfer using the DMA resources configured as the first virtual channel. The method may then involve reading second context parameters for a second virtual channel from the context memory, configuring the set of DMA resources as the second virtual channel according to the second context parameters, and initiating a second DMA transfer using the DMA resources configured as the second DMA channel.

BRIEF DESCRIPTION OF THE DRAWINGS

A better understanding of the present invention can be obtained when the following detailed description of the preferred embodiment is considered in conjunction with the following drawings, in which.

Figure 1A:
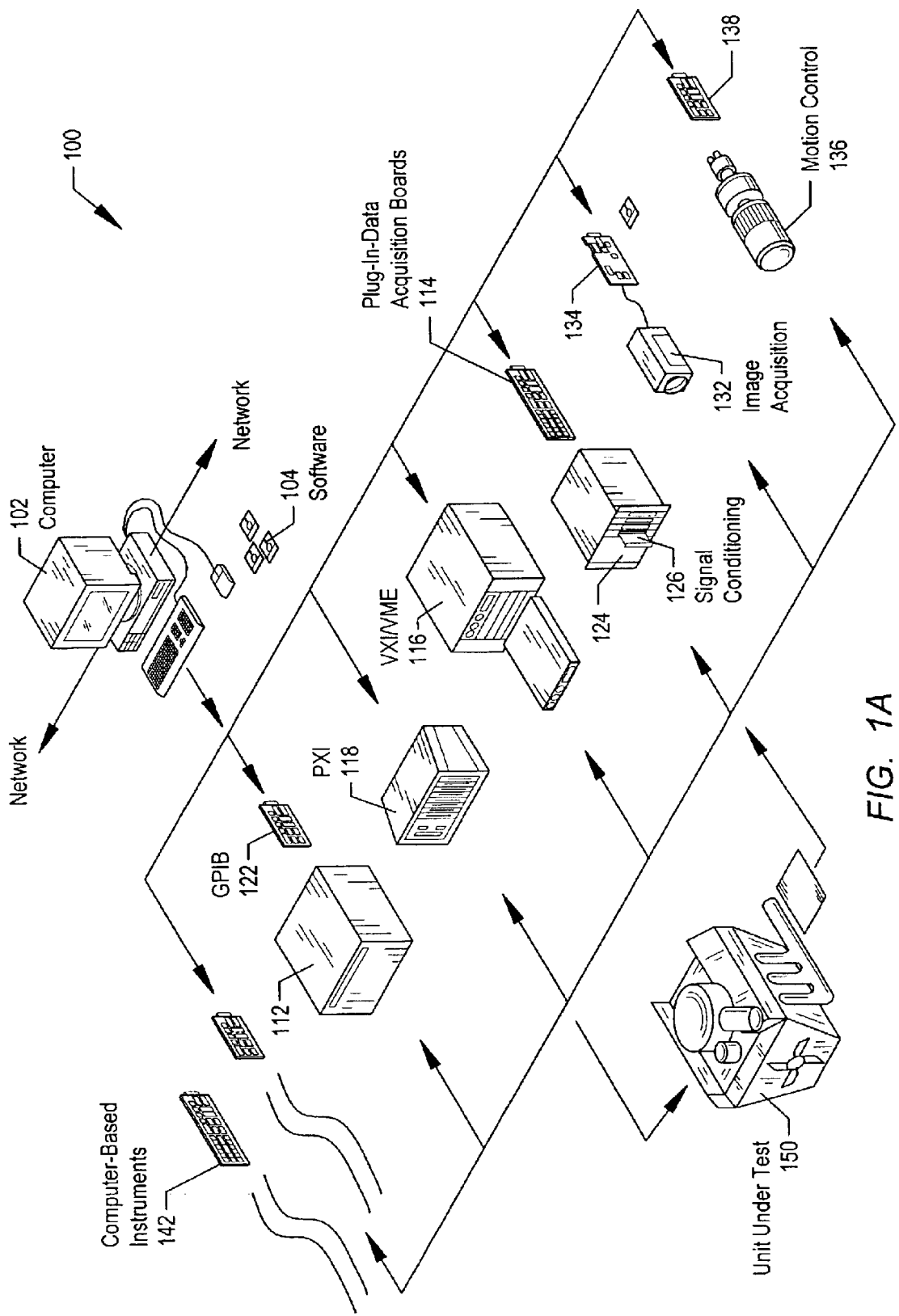
FIGS. 1A and 1B illustrate embodiments of representative instrumentation and automation systems including various measurement options.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

Incorporation by Reference

The following U.S. Patents and patent applications are hereby incorporated by reference in their entirety as though fully and completely set forth herein.

U.S. Pat. No. 5,694,333 titled "System and method for performing more efficient window context switching in an instrumentation system," issued on Dec. 2, 1997.

U.S. Pat. No. 5,659,749 titled "System and method for performing efficient hardware context switching in an instrumentation system," issued on Aug. 19, 1997.

DETAILED DESCRIPTION OF EMBODIMENTS

Figure 1B:
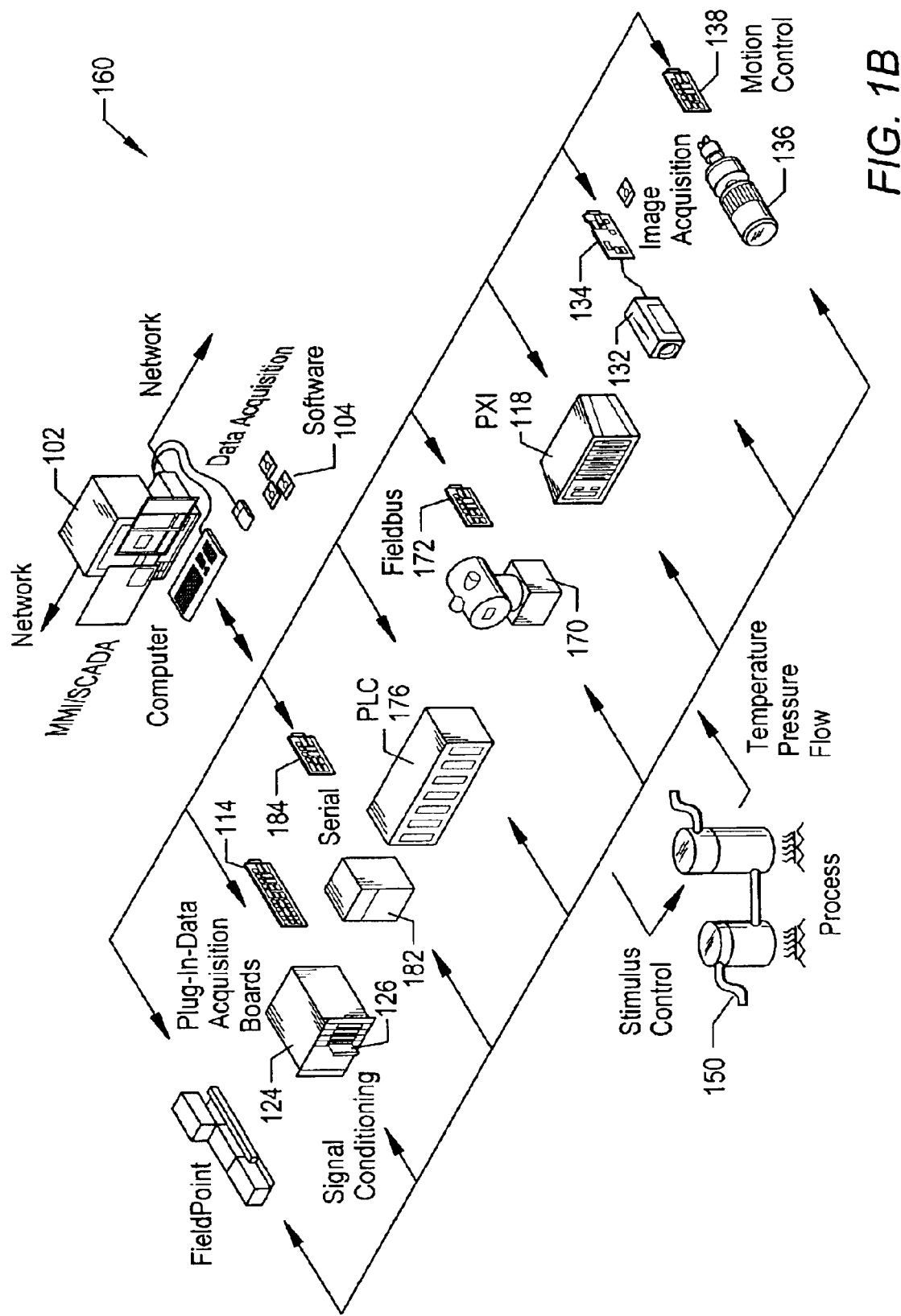

FIGS. 1A and 1B—Instrumentation Systems

FIGS. 1A and 1B illustrate exemplary systems which may include a DMA device that supports multiple virtual DMA channels as described below with respect to FIGS. 5–6. As shown, possible applications of these systems include general data acquisition, including image processing/machine vision, instrumentation, industrial automation, process control, or other purposes. While the DMA device is illustrated in the context of various exemplary instrumentation and data acquisition systems, it is noted that such a DMA device may be included in other types of systems.

FIG. 1A illustrates an exemplary instrumentation control system 100. The system 100 may include a host computer 102 that connects to one or more instruments. The host computer 102 may include a CPU, a display screen, memory, and one or more input devices such as a mouse or keyboard as shown. The computer 102 may connect through the one or more instruments to analyze, measure, and/or control a unit under test (UUT) 150 or process under test. Such instruments are examples of various I/O resources that may be included in and/or coupled to an instrumentation control system 100.

The one or more instruments may include a GPIB (General Purpose Interface Bus) instrument 112 and associated GPIB interface card 122, a data acquisition board 114 and associated signal conditioning circuitry 124, a VXI (VME eXtensions for Instrumentation) instrument 116, a PXI (PCI eXtensions for Instrumentation) instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ (Data AcQuisition) card 114 may be plugged into an I/O slot in the computer 102, such as a PCI (Peripheral Component Interconnect) bus slot, a PC (Personal Computer) Card slot, or an ISA (Industry Standard Architecture), EISA (Extended ISA), or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI bus, or other serial or parallel bus provided by the computer 102. The computer 102 may include VXI interface logic, such as a VXI, MXI, or GPIB interface card (not shown) that interfaces to the VXI chassis 116. The PXI chassis or instrument may be coupled to the computer 102 through the computer's PCI bus.

A serial instrument (not shown) may also be coupled to the computer 102 through a serial port, such as an RS-232 port, USB (Universal Serial Bus) or IEEE 1394 or 1394.2 bus provided by the computer 102. In typical instrumentation control systems, an instrument of each interface type will not be present, and many systems may only have one or more instruments of a single interface type, such as only GPIB instruments.

The instruments may be coupled through one or more sensors or transducers to the UUT 150 or process under test.

The system 100 may be used in a data acquisition and control application, in a test and measurement application, a process control application, a man-machine interface application, a hardware-in-the-loop application, or a simulation application, among others.

FIG. 1B illustrates an exemplary industrial automation system 160. The industrial automation system 160 is similar to the instrumentation or test and measurement system 100 shown in FIG. 1A. For convenience, elements which are similar or identical to elements in FIG. 1A have the same reference numerals. The system 160 includes a computer 102 that couples to one or more I/O resources. The computer 102 may include a CPU, a display screen, memory, and one or more input devices such as a mouse or keyboard as shown. The computer 102 may connect through the I/O resources to a process 150 or device to perform an automation function, such as MMI (Man Machine Interface), SCADA (Supervisory Control and Data Acquisition), portable or distributed data acquisition, process control, advanced analysis, or other control.

The I/O resources may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The fieldbus interface card 172 may be included in the computer 102 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems, a device will not be present of each interface type, and many systems may only have one or more devices of a single interface type, such as only PLCs. The devices are coupled to the device or process 150.

Figure 2A:
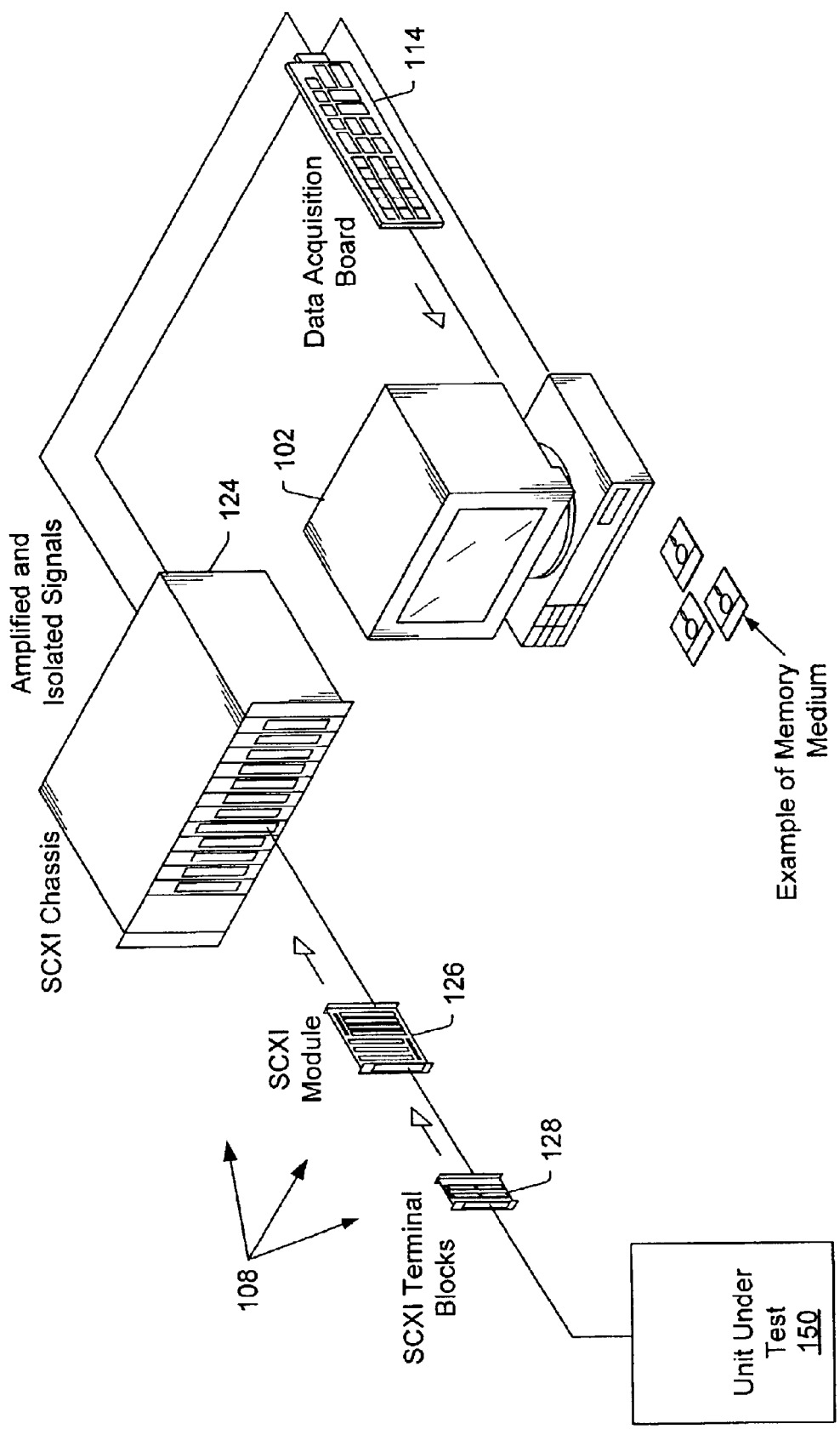
FIGS. 2A and 2B illustrate embodiments of exemplary measurement or data acquisition systems.
Figure 2B:
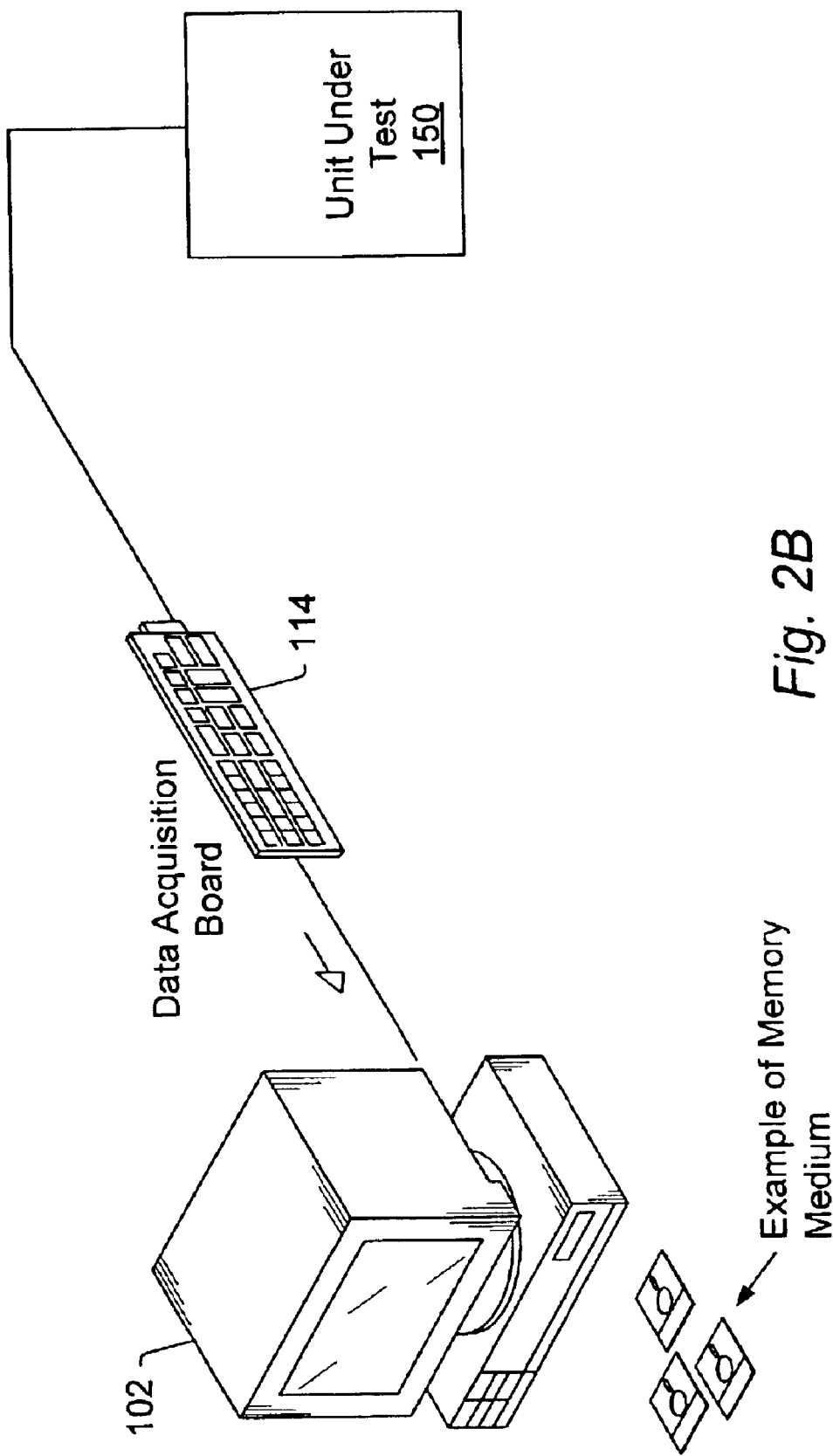

FIGS. 2A and 2B—Data Acquisition and/or Measurement Systems

FIGS. 2A and 2B illustrate exemplary data acquisition and/or measurement systems that may include an embodiment of a DMA device as described herein. FIG. 2A illustrates a system that includes computer system 102, data acquisition device or board 114, and a signal conditioning system 108. The system may be coupled to measure a unit under test 150. The system may couple to the UUT 150 through a sensor or transducer (not shown). As shown, the signal conditioning system 108 may include a signal conditioning chassis, e.g., an SCXI chassis 124, an SCXI module 126 and one or more SCXI terminal blocks 128.

FIG. 2B illustrates a system that includes computer system 102 and data acquisition device or board 114. In this embodiment, the system does not include a signal conditioning system 108. The data acquisition device or board 114 may couple through a sensor or transducer to a UUT or process under test 150.

It is noted that although the data acquisition device is shown in FIGS. 1A–2B as being implemented on a board or card, the DAQ device may be implemented in other ways (e.g., on a VXI card installed in a VXI chassis or a PXI card installed in a PXI chassis). The data acquisition device is an exemplary type of I/O resource.

Figure 3:
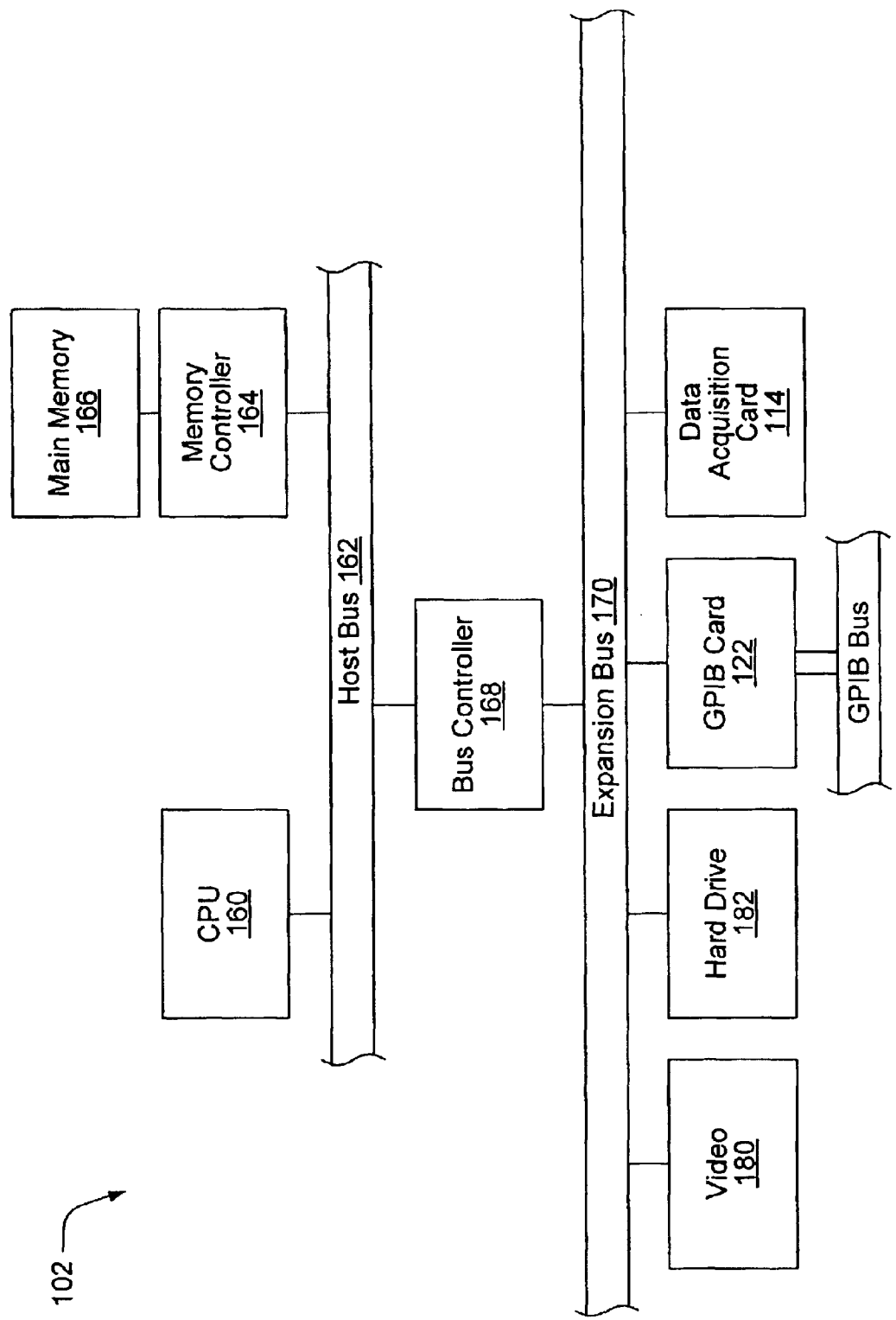
FIG. 3 is a block diagram of one embodiment of a computer system that may be used in the systems shown in FIGS. 1A, 1B, 2A and 2B.

FIG. 3—Computer System

FIG. 3 is a block diagram of an exemplary computer system 102, e.g., the computer system 102 in FIGS. 1A–2B. It is noted that any type of computer system configuration or architecture may be used, and FIG. 3 illustrates a representative PC embodiment. It is also noted that the computer system may be a general purpose computer system as shown in FIGS. 1A–2B, a computer implemented on a VXI card installed in a VXI chassis, a computer implemented on a PXI card installed in a PXI chassis, or other types of embodiments. For simplicity, the elements of a computer not necessary to understand the present invention have been omitted.

The computer 102 includes at least one processor or central processing unit or CPU 160 that is coupled to a processor or host bus 162. The CPU 160 may be any of various types, including an x86 processor, e.g., a Pentium™ class, a PowerPC™ processor, a CPU from the SPARC™ family of RISC processors, as well as others. Main memory 166 is coupled to the host bus 162 by means of memory controller 164.

Figure 5:
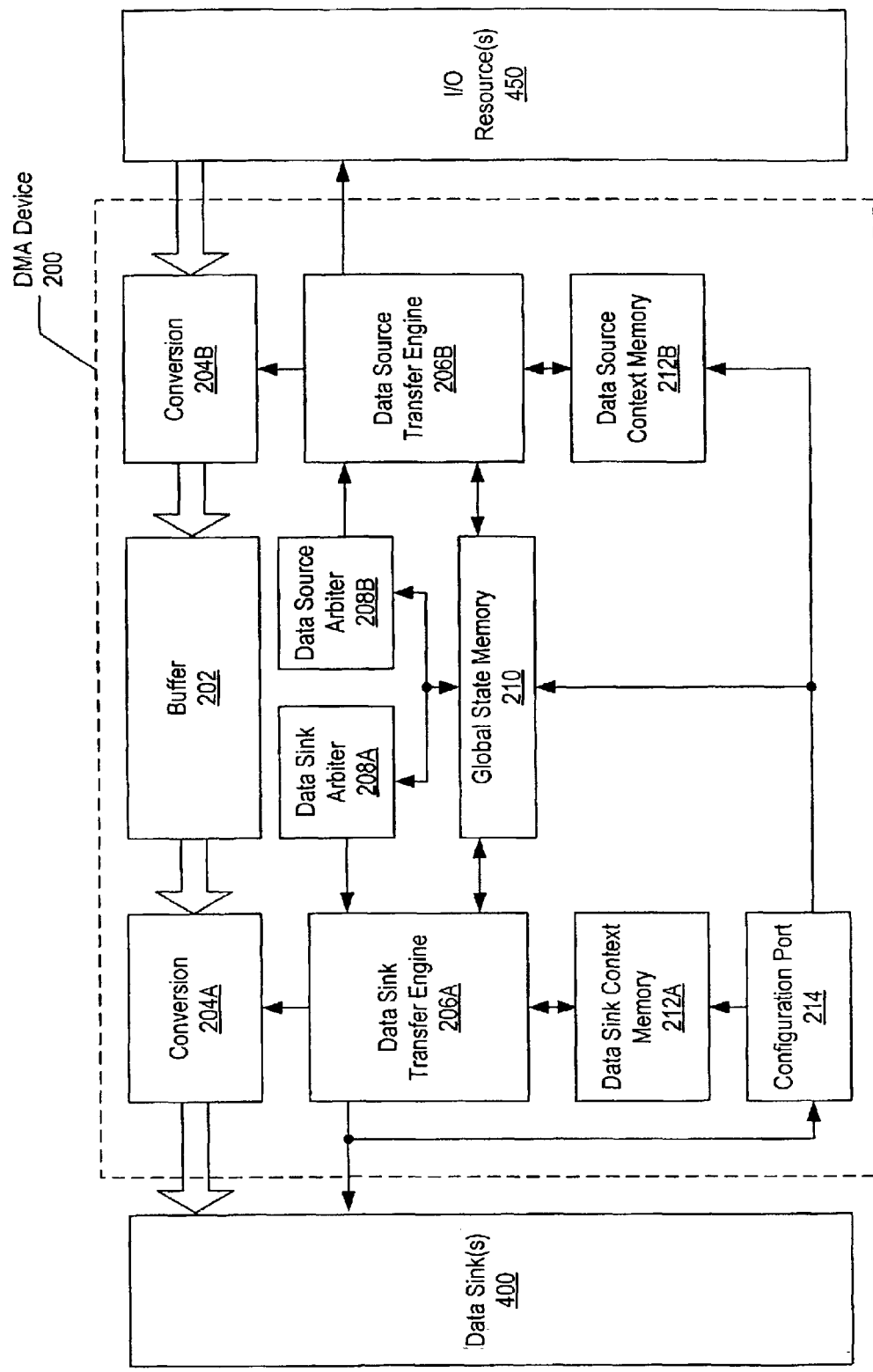
FIG. 5 is a block diagram of one embodiment of a DMA device configured to support multiple virtual DMA channels.
Figure 6:
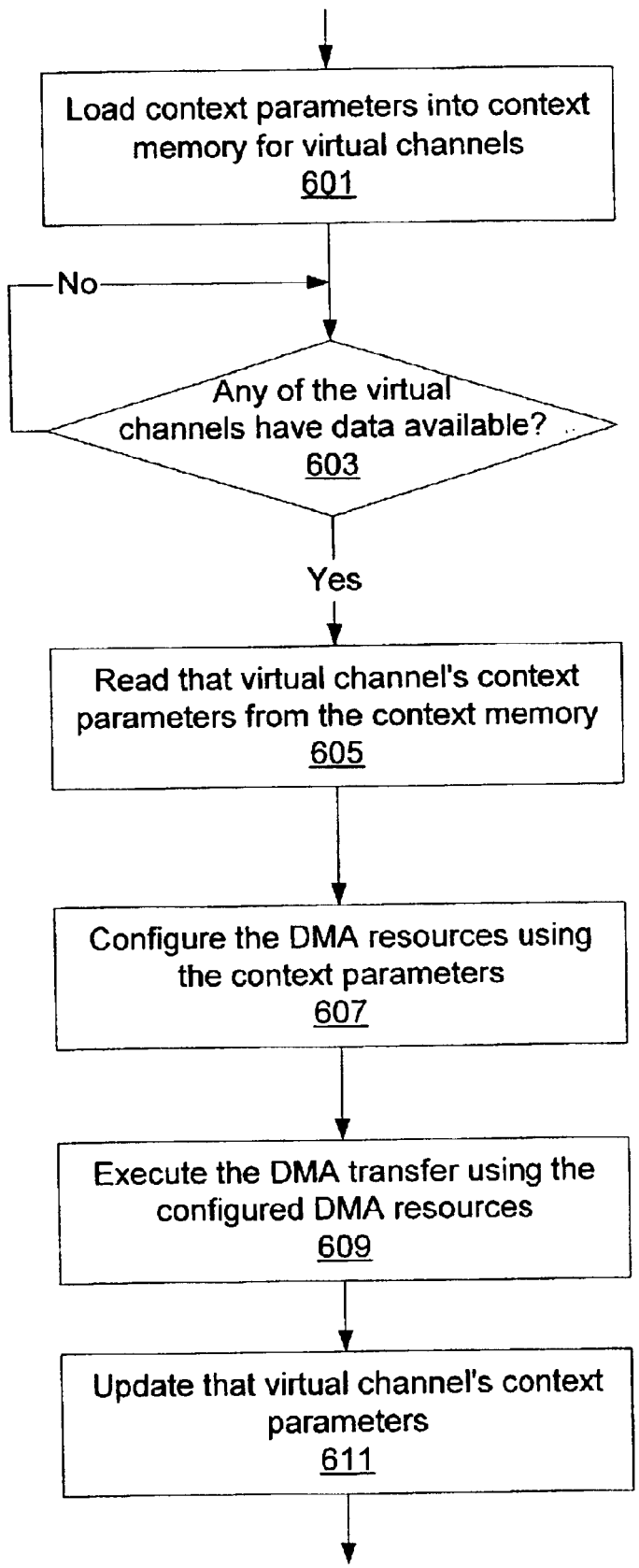
FIG. 6 is a flowchart diagram of one embodiment of a method of using a DMA device to support multiple virtual DMA channels.

The main memory 166 may store software according to one embodiment of the present invention for configuring an embodiment of a DMA device like the one shown in FIGS. 5–6. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI expansion bus, although other bus types can be used. The expansion bus 170 includes slots for various devices such as the data acquisition board 114 and/or a GPIB card 122. One or both of the data acquisition board 114 and/or GPIB card 122 may include an embodiment of a DMA device as described herein. The computer 102 may further include a video display subsystem 180 and hard drive 182 coupled to the expansion bus 170.

Generally, a computer system 102 may take various forms. As used herein, the term "computer system" is intended to encompass any of various devices which include a processor that can execute instructions from a memory medium and/or may include a programmable logic device that can be configured to execute a method or algorithm. Exemplary computer systems 102 may include a personal computer system, mainframe computer system, workstation, network appliance, Internet appliance, personal digital assistant (PDA), television system, embedded device, intelligent instrument, smart sensor, and other systems.

Figure 4:
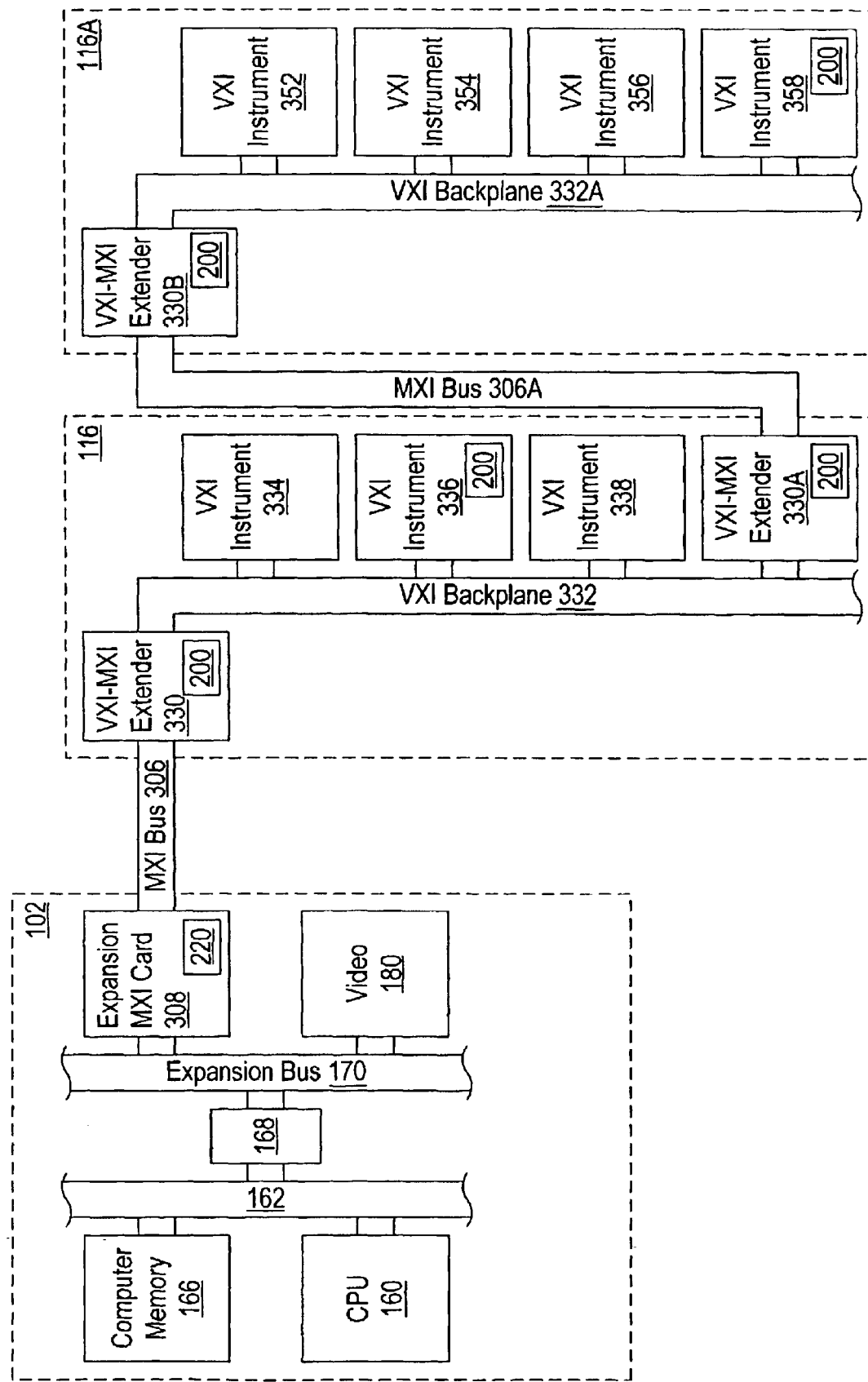
FIG. 4 is a block diagram of one embodiment of a system that includes one or more DMA devices that share DMA resources between several virtual DMA channels.

FIG. 4—DMA Devices within an Instrumentation or Data Acquisition System

Referring now to FIG. 4, a block diagram illustrating one embodiment of some of the components shown in the instrumentation and data acquisition systems of FIGS. 1A–2B is shown. As shown, the host computer 102 includes a CPU 160 and computer memory 166 connected to a host bus 162. The host bus 162 is connected through a bus controller 168 to an expansion bus 170. The expansion bus 170 may be based on any of the various types of bus standards, including the industry standard architecture (ISA), referred to as the AT bus, the extended industry standard architecture (EISA), microchannel architecture (MCA), and the NuBus, as well as others. In addition, the expansion bus may be a local bus such as the Peripheral Component Interconnect (PCI) bus or the VL bus. A video system 180 is coupled to the expansion bus 170. The expansion/MXI card 108 is preferably coupled to the expansion bus 210. The expansion bus may be the AT bus, and the expansion/MXI card 108 may be an AT-MXI interface card. An expansion/MXI interface card 308 may include an embodiment of a DMA device 200 as described with respect to FIGS. 5–6 for performing data transfers between the computer system and the various instruments.

The expansion/MXI card 308 couples through the MXI bus over a MXI cable 306 to a VXI-MXI extender 330. The VXI-MXI extender 330 is coupled to a VXI backplane 332. A plurality of VXI instruments 334, 336, and 338 are preferably coupled to the VXI backplane as shown. The VXI-MXI extender 330 translates MXI signals received from the MXI bus 306 into VXI signals that are provided over the VXI backplane 332 and vice-versa. The VXI-MXI extender 330 may include at least a portion of a DMA device 200 as described herein. One or more of these VXI instruments, such as the VXI instrument 336, may also include at least a portion of a DMA device 200. In one embodiment of the invention, the VXI mainframe 116 may include a second VXI-MXI extender 330A which couples through a second MXI cable 306A to a second VXI mainframe 116A. The second VXI mainframe 116A includes a third VXI-MXI extender 330B which connects to the MXI bus 306A. The second VXI-MXI extender may also include at least a portion of a DMA device 200. The VXI-MXI extender 330B connects to a VXI backplane 332A. A plurality of VXI instruments 352, 354, 356, and 358 may be connected to the VXI backplane 332A.

The third VXI-MXI extender 330B may include at least a portion of a DMA device 200. One or more of the VXI instruments 352–358, such as the instrument 358 may also include at least a portion of a DMA device 200. It is noted that additional VXI mainframes may be daisy-chained in this fashion, if desired.

As discussed further below, when an I/O resource (or a data sink that receives data from an I/O resource) is ready to perform a DMA transfer, shared DMA resources may be reconfigured as a particular virtual DMA channel. Each virtual DMA channel may correspond to an I/O resource such as one of instruments described above. To perform a DMA transfer, a DMA device 200 may dynamically read context parameters for that virtual DMA channel from a memory and then reconfigure DMA resources (e.g., transfer buffer(s), interface(s), address and data counters, bus(es), etc.) according to those parameters. Thus, by reconfiguring the resources as different virtual DMA channels, various I/O resources may perform transfers involving multiple independent data streams using the same DMA resources.

FIG. 5—DMA Device

FIG. 5 shows a block diagram of one embodiment a DMA device 200. As shown, DMA device may be configured to transfer data from one or more I/O resources 450 to one or more data sinks 400. In one embodiment, I/O resources 450 may include various VXI and/or MXI instruments on MXI or VXI buses, as shown in FIG. 4. Data sinks 400 may include devices coupled to a processor bus (e.g., a PCI bus), an MXI or VXI bus, or a network bus (e.g., Ethernet, USB (Universal Serial Bus), or a Firewire bus). It is noted that the arrows in FIG. 4 show data and control flow and that the actual physical interconnections between components may be substantially more complex.

DMA device 200 may use context parameters corresponding to virtual DMA channels to dynamically reconfigure DMA resources as different virtual DMA channels. DMA device 200 may include a data source context memory 212B configured to store context parameters for each virtual DMA channel between I/O resource(s) 450 and buffer 202. DMA device 200 may also include data sink context memory 212A configured to store context parameters that correspond to virtual DMA channels between buffer 202 and data sink(s) 400. Each virtual channel may correspond to one of the I/O resources 450. Note that there may be a different number of virtual DMA channels than there are I/O resources in many embodiments.

In some embodiments, the context memories 212A and 212B may be contained in the same physical memory media. In other embodiments, context memories 212A and 212B may each be implemented in a separate memory device. In one embodiment, there may be a single context memory configured to store context parameters that correspond to a plurality of virtual DMA channels between I/O resource(s) 450 and data sink(s) 400 (as opposed to the separate source and sink context memories shown in FIG. 5).

The context memory or memories may be implemented in a set of registers or in one or more memory devices such as RAM, DRAM, SRAM, DDRDRAM, RDRAM, etc. Additionally, the context memories may be implemented using dual-ported or multi-ported memory so that a transfer engine can access the context memory while the context parameters are being updated (e.g., by configuration port 214 as described below). The size of the context memory and the size of each virtual channel's context parameters may determine the number of virtual channels that the DMA device 200 is capable of supporting at a given time.

Context parameters may include data counts and address values that identify a data stream to be transferred. Other context parameters may identify a particular data transfer protocol to be used for each virtual channel. For example, hardware buses may include several different signaling or bus protocols (e.g., the MXI (Multisystem eXtension Interface) bus includes both a normal protocol and a high-speed protocol). Different virtual channels may use different data transfer protocols, and thus the data transfer protocol may be included as one of the context parameters for each virtual channel.

Another context parameter may specify which mode the DMA device should operate in for a particular virtual channel. For example, in some embodiments, the DMA device 200 may be configured to perform data transfers using either physical addressing or virtual addressing. With virtual addressing, memory locations identified by contiguous virtual addresses may not actually be located at contiguous physical addresses. Accordingly, the DMA device 200 may be configured to perform transfers using scatter-gather-type DMA. For example, in some embodiments, DMA transfers may be performed by using (e.g., by parsing, walking, or otherwise processing) a table of address and size pairs describing the physical addresses at which the virtually-addressed data resides. The table may be created by an operating system running on a host computer system and stored in the context memory 212A and/or 212B along with the other context parameters for a particular virtual channel (alternatively, the context memory may contain a pointer to a memory location at which the table is stored). Additionally, a mode indication indicating whether a DMA transfer should be performed normally or using a scatter-gather technique may be stored as part of each virtual channel's context parameters. One embodiment of a scatter-gather-type technique is described in more detail in U.S. Pat. No. 5,678,063 titled "System and Method for Performing Efficient Random Write Operations," issued on Oct. 14, 1997, which is herein incorporated by reference in its entirety.

Global state memory 210 may contain state information for each virtual DMA channel. Global state memory 210 may be updated whenever data is available to be transferred from an I/O resource 450 or buffer 202 so that global state memory 210 indicates which virtual DMA channels, if any, have data available for transfer.

Data source arbiter 208B and data sink arbiter 208A (collectively referred to as arbiters 208) may be included in DMA device 200 to detect whenever data is available to be transferred in a particular virtual DMA channel by monitoring the indications in the global state memory 210. If more than one virtual DMA channel has data available, arbiters 208 may be configured to select a virtual DMA channel (e.g., in a round-robin fashion, based on priorities assigned to each virtual DMA channel, or on a first-come, first-served basis) and to notify the appropriate transfer engine 206A or 206B that a DMA operation should be initiated for that virtual DMA channel.

Data source transfer engine 206B and data sink transfer engine 206B (collectively referred to as transfer engines 206) may be configured to perform a DMA transfer for a particular virtual DMA channel in response to being notified by the corresponding arbiter 208 that data is available in that channel. Each transfer engine 206 may initiate a DMA transfer by reading the context parameters for a virtual DMA channel from data source context memory 212B. Using the context parameters, a transfer engine 206 may configure DMA resources (e.g., buffer 202, conversion units 204A and/or 204B, the bus interface(s) that receive data from the data sink(s) 450 and/or provide data to data source(s) 400, and/or address and data counters) used to perform the DMA as that virtual DMA channel. The transfer engines 206A and 206B may be implemented as state machines.

Transfer engines 206B and 206A may include address and data counters (not shown) used in performing DMA transfers. Each virtual channel's context parameters may include initial (and/or final) values for these data and address counters. As a DMA transfer is performed, the data and address counters may be incremented (or decremented, as appropriate). Each transfer engine may use the address values to transfer data (e.g., from a data source to a data sink, from a data source to buffer 202, and/or from buffer 202 to a data sink) to or from the correct addresses. The data counters may be used to determine how much data to transfer. In some embodiments, a threshold value may be used to limit the amount of data that can be transferred (e.g., the limit may be selected so that buffer 202 does not overflow during a transfer). In these embodiments, the transfer engines may compare the current transfer size to the threshold value to determine if the transfer should be terminated. Once a transfer is complete or terminated, each transfer engine may update the context parameters in one of the context memories to reflect the new current address and data counts. If the transfer completed, each transfer engine may also update the global state memory 210 to indicate that data is no longer available in that virtual channel.

In some embodiments, DMA device 200 may only include one transfer engine configured to handle data transfers between I/O resources(s) 450 and data sink(s) 400. In other embodiments, separate transfer engines may be used to handle DMA transfers from I/O resources(s) 450 to buffer 202 and from buffer 202 to data sink(s) 400. In embodiments with more than one transfer engine, the data source transfer engine 206B may provide an indication in global state memory indicating that data has been acquired for a particular virtual channel when performing a DMA transfer. In response to the indication, data sink arbiter 208A may notify data sink transfer engine 206A that data is available for that virtual channel, causing data sink transfer engine 206A to initiate a DMA transfer in that virtual channel from buffer 202 to the appropriate data sink.

If separate transfer engines are used (as illustrated in FIG. 4), buffer 202 may include dual-ported or multi-ported memory, allowing data to be written (e.g., from a data source 450) at the same time it is being read (e.g., to a data sink 400). In some embodiments, buffer 202 may be implemented in a memory located externally to the DMA device 200. Buffer 202 may be configured as a FIFO (First In First Out) memory.

In one embodiment, an additional data buffer may be included to handle transfers from one of the data sinks to one of the data sources (in embodiments where certain of data sink(s) 400 and source(s) 450 are configured as both data sinks and data sources). Alternatively, the functionality of the entire DMA transfer device 200 may be duplicated to support multiple virtual DMA channels from data sink(s) 400 to I/O resources(s) 450.

Configuration port 214 may be configured to update the context memories 206A and 206B in response to new context parameters for a particular virtual channel being provided to the DMA device (e.g., by an operating system running on a host computer system). Configuration port 214 may also be configured to monitor the data sinks 400 and/or I/O resources 450 in order to determine when data is available for transfer in a virtual channel. If a virtual channel has data available, configuration port 214 may update that virtual channel's indications in the global state memory 210 accordingly. For example, configuration port 214 may be configured to detect a request for data from a host computer system and, in response, to update the global state memory for a particular virtual channel to indicate that data is available for transfer in that virtual channel.

Conversion units 204A and/or 204B (collectively referred to as conversion units 204) may be included in DMA device 200 in order to perform various data conversion functions on data being transferred. The conversion units 204 may be configurable to provide several different functions such as scaling, swapping, averaging, digital filtering, or other user-defined functions. The conversion units 204 may be configured according to context parameters stored in context memory 212A or 212B for a particular virtual channel. In some embodiments, the conversion units 204 may provide several selectable functions (e.g., scaling, swapping). Thus, the context parameters for a virtual channel may identify which selectable function(s) should be performed by a conversion unit. Additionally, in some embodiments, the conversion units may be reconfigured according to user-specified hardware descriptions. Accordingly, the context parameters for one virtual channel may include a pointer to the memory location storing a hardware description of a user-defined function. When the DMA device is configured as that virtual channel, one of the transfer engines 206A and 206B may configure an appropriate conversion unit 204 to perform this function by providing the hardware description to the appropriate conversion unit. The conversion units may also be configurable to provide no data conversion at all for certain virtual channels.

Note that the DMA device 200 shown in FIG. 5 may be configured to support several data streams that have independent sample rates in some embodiments. Furthermore, in many embodiments, DMA transfers in each virtual channel may be started and stopped independently of each other (so long as the DMA resources are not already in use by another virtual channel). Additionally, reconfiguring conversion units 204 using a virtual channel's context parameters to perform data processing functions for each virtual channel may make it unnecessary to further process the data transferred in the virtual channel before providing it to an end application.

FIG. 6 shows a flowchart of one embodiment of a method of reconfiguring a set of DMA resources as a virtual DMA channel. Note that while the functional blocks 601–609 are arranged in a certain order in the illustrated embodiment, this arrangement is merely illustrative and does not imply that the method requires any particular temporal order. Other embodiments may perform the functional blocks in a different order.

At 601, the context parameters for the virtual DMA channels to be supported are stored into a context memory in a DMA device. The context parameters may include actual configuration information (e.g., an indication as to whether scatter-gather DMA should be used, an indication of the starting address and data count for a particular DMA channel) and/or pointers to memory locations storing configuration information (e.g., a pointer to a hardware description describing a data processing function to be performed on the data as it is transferred). The context parameters may be loaded into the DMA device's context memory by software (e.g., an operating system) running on a host computer. When data is available in a particular virtual channel (e.g., as indicated by the value of a bit corresponding to that virtual channel in the global state memory in the DMA device), the DMA device reads the context parameters from the context memory (which may involve reading one or more pointers from the context memory and using those pointers to retrieve one or more context parameters from system memory), as shown at 603–605. Determining whether any DMA channels have data available may involve monitoring signals from various I/O resources such as instrumentation or measurement devices and/or monitoring signals from a host computer system and setting a bit in the global state memory of the DMA device whenever a virtual channel has data available or is ready to receive data. If more than one channel has data available, an arbiter in the DMA device may choose which virtual channel to perform a transfer for (e.g., on a first-come, first-served basis, using a round-robin scheme, or using a priority scheme).

At 607, the DMA device uses the context parameters to configure its DMA resources as the virtual channel. For example, the DMA device may update counters in a transfer engine that track the transfer size for the virtual channel. The DMA device may update a counter or register that identifies the current address for the transfer. Based on the context parameters of the virtual channel, the DMA device may also select a data processing function to perform on the data as it is transferred, select an operating mode, and/or select a bus or signaling protocol.

Using the reconfigured DMA resources, the DMA device performs the transfer as the virtual DMA channel, as shown at 609. As the transfer progresses, the DMA device updates certain values (e.g., current address and transfer size) in order to identify when the transfer is complete. In one embodiment, the DMA device may also update a value indicating how much data has been transferred. This value may be used to set a maximum size for the transfer (e.g., based on the size of a buffer in the DMA device).

When the transfer is complete (e.g., either because there is no longer data available for the virtual channel or because the transfer reached the maximum transfer size), the DMA device may also update an indication (e.g., in a global state memory) that indicates whether that virtual channel currently has data available. If the transfer terminated (e.g., because the maximum transfer size was reached), the indication may continue to indicate that the virtual channel has data available.

In addition to updating the virtual channel's context parameters, the DMA device may also provide an indication that data has been acquired for that virtual channel. This indication may initiate a second DMA transfer (e.g., from a buffer associated with the DMA device to the data sink for that virtual channel). This transfer may be performed in a similar manner to the first transfer (e.g., by reading appropriate context parameters from context memory, reconfiguring DMA resources, performing the DMA transfer using the reconfigured resources, and updating the context parameters when the transfer completes).

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system, comprising:
    a context memory configured to store context parameters for each of a plurality of virtual DMA channels;
    a set of DMA resources, wherein the set of DMA resources includes a buffer;
    a DMA controller coupled to the context memory, wherein the DMA controller is configured to configure the set of DMA resources as different virtual DMA channels using context parameters associated with different respective ones of the plurality of virtual DMA channels; and
    a plurality of I/O resources coupled to the DMA resources, wherein each of the plurality of virtual DMA channels is associated with one of the plurality of I/O resources;
    wherein the DMA controller is further configured to initiate a first DMA transfer in a first virtual DMA channel of the plurality of virtual DMA channels according to the first virtual DMA channel's context parameters stored in the context memory, wherein the first DMA transfer transfers data from a first one of the plurality of I/O resources to the buffer; and
    wherein the DMA controller is further configured to initiate a second DMA transfer in a second virtual DMA channel of the plurality of virtual DMA channels according to the second virtual DMA channel's context parameters stored in the context memory, wherein the second DMA transfer transfers data from a second one of the plurality of I/O resources to the buffer.

2. The system of claim 1, wherein the DMA controller is configured to terminate the first DMA transfer in response to a threshold amount of data being transferred in the first DMA transfer.

3. The system of claim 1, wherein the set of DMA resources comprises a data conversion unit configurable to perform a plurality of data processing functions, wherein the context parameters associated with the first virtual DMA channel specify that the data conversion unit should be configured to perform a first one of the data processing functions when the DMA resources are configured as the first virtual DMA channel.

4. The system of claim 3, wherein the data conversion unit is configurable to perform at least one of: data scaling, data swapping, data averaging, and digital filtering.

5. The system of claim 3, wherein the data conversion unit is reconfigurable to perform the first data processing function using a hardware description.

6. The system of claim 1, wherein the set of DMA resources comprises a bus configurable to perform data transfers using a plurality of protocols, wherein the context parameters associated with the first virtual DMA channel specify that the bus should be configured to perform data transfers using a first one of the protocols when the DMA resources are configured as the first virtual DMA channel.

7. The system of claim 1, wherein the context parameters associated with the first virtual DMA channel specify that DMA transfers should be performed using scatter-gather DMA when the DMA resources are configured as the first virtual DMA channel.

8. The system of claim 1, wherein the set of DMA resources comprises address counters and data counters, wherein the context parameters associated with the first virtual DMA channel specify initial values for the address and data counters when the DMA resources are configured as the first virtual DMA channel.

9. The system of claim 1, further comprising a global state memory configured to store an indication for each of the virtual DMA channels, wherein each indication indicates whether data is available to be transferred using a respective virtual DMA channel.

10. The system of claim 9, wherein the DMA controller is configured to update the global state memory in response to performing a DMA transfer.

11. The system of claim 1, wherein the DMA controller is configured to update context parameters for the first virtual DMA channel in response to performing a DMA transfer in which the set of DMA resources were configured using the first virtual DMA channel's associated context parameters.

12. The system of claim 1, further comprising a configuration port configured to receive new context parameters associated with the first virtual DMA channel from a host system and to update the context parameters in the context memory accordingly.

13. The system of claim 12, wherein the configuration port is configured to monitor at least one of a plurality of data sinks and the plurality of I/O resources to determine whether data is available to be transferred in one of the virtual DMA channels.

14. A method of performing DMA transfers, the method comprising:
    reading first context parameters for a first virtual channel from a context memory, wherein the context memory stores context parameters for a plurality of virtual channels, wherein each of the plurality of virtual channels corresponds to one of a plurality of I/O devices;
    configuring a set of DMA resources as the first virtual channel according to the first context parameters;
    initiating a first DMA transfer to transfer data from a first one of the plurality of I/O devices using the DMA resources configured as the first virtual channel
    reading second context parameters for a second virtual channel from the context memory;
    configuring the set of DMA resources as the second virtual channel according to the second context parameters; and initiating a second DMA transfer to transfer data from a second one of the plurality of I/O devices using the DMA resources configured as the second virtual channel.

15. The method of claim 14, further comprising terminating the first DMA transfer in response to a threshold amount of data being transferred in the first DMA transfer.

16. The method of claim 14, wherein said configuring the set of DMA resources as the first virtual channel according to the first context parameters comprises configuring a data conversion unit to perform a first data processing function specified by the first context parameters.

17. The method of claim 14, wherein said configuring the set of DMA resources as the first virtual channel according to the first context parameters comprises configuring a bus to use a first protocol specified by the first context parameters.

18. The method of claim 14, wherein said configuring the set of DMA resources as the first virtual channel according to the first context parameters comprises configuring the set of DMA resources to perform DMA transfers using scatter-gather DMA, as specified by the first context parameters.

19. The method of claim 14, wherein said configuring the set of DMA resources as the first virtual channel according to the first context parameters comprises configuring address counters and data counters with initial values specified by the first context parameters.

20. The method of claim 14, further comprising detecting an indication for each of the virtual channels, wherein each indication indicates whether data is available to be transferred using a respective virtual channel, and wherein said reading the first context parameters, said configuring the set of DMA resources as the first virtual channel, and said initiating the first DMA transfer occur in response to said detecting, wherein said detecting detects that data is available to be transferred using the first virtual channel.

21. The method of claim 20, further comprising updating the first virtual channel's indication in response to performing the first DMA transfer.

22. The method of claim 14, further comprising updating the first context parameters in response to performing the first DMA transfer.

23. The method of claim 14, further comprising monitoring at least one of a plurality of data sinks and the plurality of I/O resources to determine whether data is available to be transferred in one of the virtual channels.

24. A system, comprising:
a context memory configured to store context parameters for each of a plurality of virtual DMA channels;
a set of DMA resources;
a DMA controller coupled to the context memory, wherein the DMA controller is configured to configure the set of DMA resources as different virtual DMA channels using context parameters associated with different respective ones of the plurality of virtual DMA channels; and
a plurality of I/O resources coupled to the DMA resources, wherein each of the plurality of virtual DMA channels is associated with one of the plurality of I/O resources;
wherein the set of DMA resources comprises a data conversion unit configurable to perform a plurality of data processing functions, wherein the context parameters associated with a first virtual DMA channel of the plurality of virtual DMA channels specify that the data conversion unit should be configured to perform a first one of the data processing functions when the DMA resources are configured as the first virtual DMA channel.

25. The system of claim 24, wherein the data conversion unit is configurable to perform at least one of: data scaling, data swapping, data averaging, and digital filtering.

26. The system of claim 24, wherein the data conversion unit is reconfigurable to perform the first data processing function using a hardware description.

27. A system, comprising:
a context memory configured to store context parameters for each of a plurality of virtual DMA channels;
a set of DMA resources;
a DMA controller coupled to the context memory, wherein the DMA controller is configured to configure the set of DMA resources as different virtual DMA channels using context parameters associated with different respective ones of the plurality of virtual DMA channels; and
a plurality of I/O resources coupled to the DMA resources, wherein each of the plurality of virtual DMA channels is associated with one of the plurality of I/O resources;
wherein the set of DMA resources comprises a bus configurable to perform data transfers using a plurality of protocols, wherein the context parameters associated with a first virtual DMA channel of the plurality of virtual DMA channels specify that the bus should be configured to perform data transfers using a first one of the protocols when the DMA resources are configured as the first virtual DMA channel.

28. A system, comprising:
a context memory configured to store context parameters for each of a plurality of virtual DMA channels;
a set of DMA resources;
a DMA controller coupled to the context memory, wherein the DMA controller is configured to configure the set of DMA resources as different virtual DMA channels using context parameters associated with different respective ones of the plurality of virtual DMA channels; and
a plurality of I/O resources coupled to the DMA resources, wherein each of the plurality of virtual DMA channels is associated with one of the plurality of I/O resources;
wherein the context parameters associated with a first virtual DMA channel of the plurality of virtual DMA channels specify that DMA transfers should be performed using scatter-gather DMA when the DMA resources are configured as the first virtual DMA channel.

29. A system, comprising:
a context memory configured to store context parameters for each of a plurality of virtual DMA channels;
a set of DMA resources;
a DMA controller coupled to the context memory, wherein the DMA controller is configured to configure the set of DMA resources as different virtual DMA channels using context parameters associated with different respective ones of the plurality of virtual DMA channels;
a plurality of I/O resources coupled to the DMA resources, wherein each of the plurality of virtual DMA channels is associated with one of the plurality of I/O resources; and a configuration port configured to receive new context parameters associated with a first virtual DMA channel of the plurality of virtual DMA channels from a host system and to update the context parameters in the context memory accordingly.

30. The system of claim 29, wherein the configuration port is configured to monitor at least one of a plurality of data sinks and the plurality of I/O resources to determine whether data is available to be transferred in one of the virtual DMA channels.

31. A method of performing DMA transfers, the method comprising:

reading first context parameters for a first virtual channel from a context memory, wherein the context memory stores context parameters for a plurality of virtual channels, wherein each of the plurality of virtual channels corresponds to one of a plurality of I/O devices;

configuring a set of DMA resources as the first virtual channel according to the first context parameters;

initiating a first DMA transfer to transfer data from a first one of the plurality of I/O devices using the DMA resources configured as the first virtual channel; and terminating the first DMA transfer in response to a threshold amount of data being transferred in the first DMA transfer.

32. A method of performing DMA transfers, the method comprising:

reading first context parameters for a first virtual channel from a context memory, wherein the context memory stores context parameters for a plurality of virtual channels, wherein each of the plurality of virtual channels corresponds to one of a plurality of I/O devices;

configuring a set of DMA resources as the first virtual channel according to the first context parameters; and initiating a first DMA transfer to transfer data from a first one of the plurality of I/O devices using the DMA resources configured as the first virtual channel;

wherein said configuring comprises configuring a data conversion unit to perform a first data processing function specified by the first context parameters.

33. A method of performing DMA transfers, the method comprising:

reading first context parameters for a first virtual channel from a context memory, wherein the context memory stores context parameters for a plurality of virtual channels, wherein each of the plurality of virtual channels corresponds to one of a plurality of I/O devices;

configuring a set of DMA resources as the first virtual channel according to the first context parameters; and initiating a first DMA transfer to transfer data from a first one of the plurality of I/O devices using the DMA resources configured as the first virtual channel;

wherein said configuring comprises configuring the set of DMA resources to perform DMA transfers using scatter-gather DMA, as specified by the first context parameters.

34. A method of performing DMA transfers, the method comprising:

reading first context parameters for a first virtual channel from a context memory, wherein the context memory stores context parameters for a plurality of virtual channels, wherein each of the plurality of virtual channels corresponds to one of a plurality of I/O devices;

configuring a set of DMA resources as the first virtual channel according to the first context parameters;

initiating a first DMA transfer to transfer data from a first one of the plurality of I/O devices using the DMA resources configured as the first virtual channel; and detecting an indication for each of the virtual channels, wherein each indication indicates whether data is available to be transferred using a respective virtual channel, and wherein said reading, said configuring and said initiating occur in response to said detecting, wherein said detecting detects that data is available to be transferred using the first virtual channel.

35. The method of claim 34, further comprising updating the first virtual channel's indication in response to performing the first DMA transfer.

* * * * *